United States Patent
Zeng (10) Patent No.: US 11,057,550 B2
(45) Date of Patent: Jul. 6, 2021

(54) CAMERA LENS CONTROLLER WITH ADAPTIVE DISPLAY FOR MARKING

(71) Applicant: TILTA INC., Burbank, CA (US)

(72) Inventor: Wenping Zeng, Shenzhen (CN)

(73) Assignee: TILTA INC., Burbank, CA (US)

( * ) Notice: Subject to any disclaimer, the term of this patent is extended or adjusted under 35 U.S.C. 154(b) by 0 days.

(21) Appl. No.: 16/447,867

(22) Filed: Jun. 20, 2019

(65) Prior Publication Data

US 2020/0404127 A1    Dec. 24, 2020

(51) Int. Cl.
| | | |
|---|---|---|
| H04N 5/225 | (2006.01) | |
| G02B 7/02 | (2021.01) | |
| G02F 1/13357 | (2006.01) | |
| H04N 5/232 | (2006.01) | |
| G02B 7/10 | (2021.01) | |

(52) U.S. Cl.
CPC ........... H04N 5/2254 (2013.01); G02B 7/021 (2013.01); G02B 7/10 (2013.01); G02F 1/133603 (2013.01); H04N 5/2252 (2013.01); H04N 5/232 (2013.01)

(58) Field of Classification Search
CPC ............................ H04N 5/2252; H04N 5/2254
USPC ........................................................ 348/375
See application file for complete search history.

(56) References Cited

U.S. PATENT DOCUMENTS

| | | | | |
|---|---|---|---|---|
| 5,564,812 | A * | 10/1996 | Berardi .................. | H01H 9/161 116/310 |
| 8,189,088 | B2 * | 5/2012 | Nagata ............... | H04N 5/23209 348/340 |
| 9,083,876 | B2 * | 7/2015 | Voss ......................... | G03B 3/12 |
| 2003/0025802 | A1 * | 2/2003 | Mayer, Jr. ............. | G03B 17/00 348/211.99 |
| 2005/0140816 | A1 * | 6/2005 | Tschida .............. | H04N 5/23209 348/360 |
| 2013/0093937 | A1 * | 4/2013 | Kawai ................ | H04N 5/23212 348/345 |
| 2013/0182137 | A1 * | 7/2013 | Voss ....................... | G03B 17/56 348/211.1 |
| 2019/0250804 | A1 * | 8/2019 | Voss ...................... | G06F 3/0488 |
| 2019/0394388 | A1 * | 12/2019 | Takanashi .......... | H04N 5/23209 |
| 2019/0394390 | A1 * | 12/2019 | Nagao ................ | H04N 5/23212 |
| 2020/0137292 | A1 * | 4/2020 | Liang .................... | F16M 11/16 |

* cited by examiner

Primary Examiner — Anthony J Daniels
(74) Attorney, Agent, or Firm — Loza & Loza, LLP; Derek Yeung (57) ABSTRACT

A camera lens control system includes a hand control unit equipped with an adaptive display for marking. The adaptive display is electronically controlled or programmed to display any desired objects for marking. The hand control unit includes a body, a control knob attached to the body, and a marking ring concentrically coupled with the control knob. The control knob is configured to receive a user input for controlling a lens setting. The marking ring includes a display configurable to display one or more markings corresponding to the lens setting.

13 Claims, 11 Drawing Sheets

CAMERA LENS CONTROLLER WITH ADAPTIVE DISPLAY FOR MARKING

TECHNICAL FIELD

The technology discussed below relates generally to camera lens control, and more particularly, to a wireless camera lens controller with an adaptive display for marking.

INTRODUCTION

In motion picture or video production, a camera may be controlled using a lens control system. An exemplary lens control system includes a hand unit and one or more control motors for controlling an array of lens and camera functions, for example, focus, iris, and zoom operations. One example of a lens control system is a three-axis or 3-channel lens control system. A three-axis lens control system generally includes a hand unit for controlling one or more control motors each configured to control focus, iris, zoom, and/or other camera functions. The hand unit may provide a user interface and various control functions of the control motors such as torque, speed, lens calibration profiles, etc.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the present disclosure provides a hand unit for a camera control system for controlling a lens. The hand unit includes a body. The hand unit further includes a control knob rotatably attached to the body, and the control knob is configured to receive a user input for controlling a lens setting. The hand unit further includes a marking ring concentrically coupled with the control knob, and the marking ring includes a display configurable to display one or more markings corresponding to the lens setting.

Another aspect of the present disclosure provides a method of operating a hand unit of a camera control system for controlling a camera. The hand unit includes a body and an input device operatively attached to the body. The method operates the input device to a first position to cause a first lens installed on the camera to be set in a first predetermined setting. The method records a first mapping between the first position and the first predetermined setting. The method further displays a first marking on a display of the input device to denote the first position.

Another aspect of the present disclosure provides a camera control system. The camera control system includes a hand unit including a control knob configured to receive a user input for controlling a first lens setting. The camera control system further includes a slider bar detachably attached to the hand unit. The slider bar includes a slider operable in a transitional direction for controlling a second lens setting, and an elongated display extending in parallel to the transitional direction. The elongated display is configurable to display one or more markings corresponding to the second lens setting.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
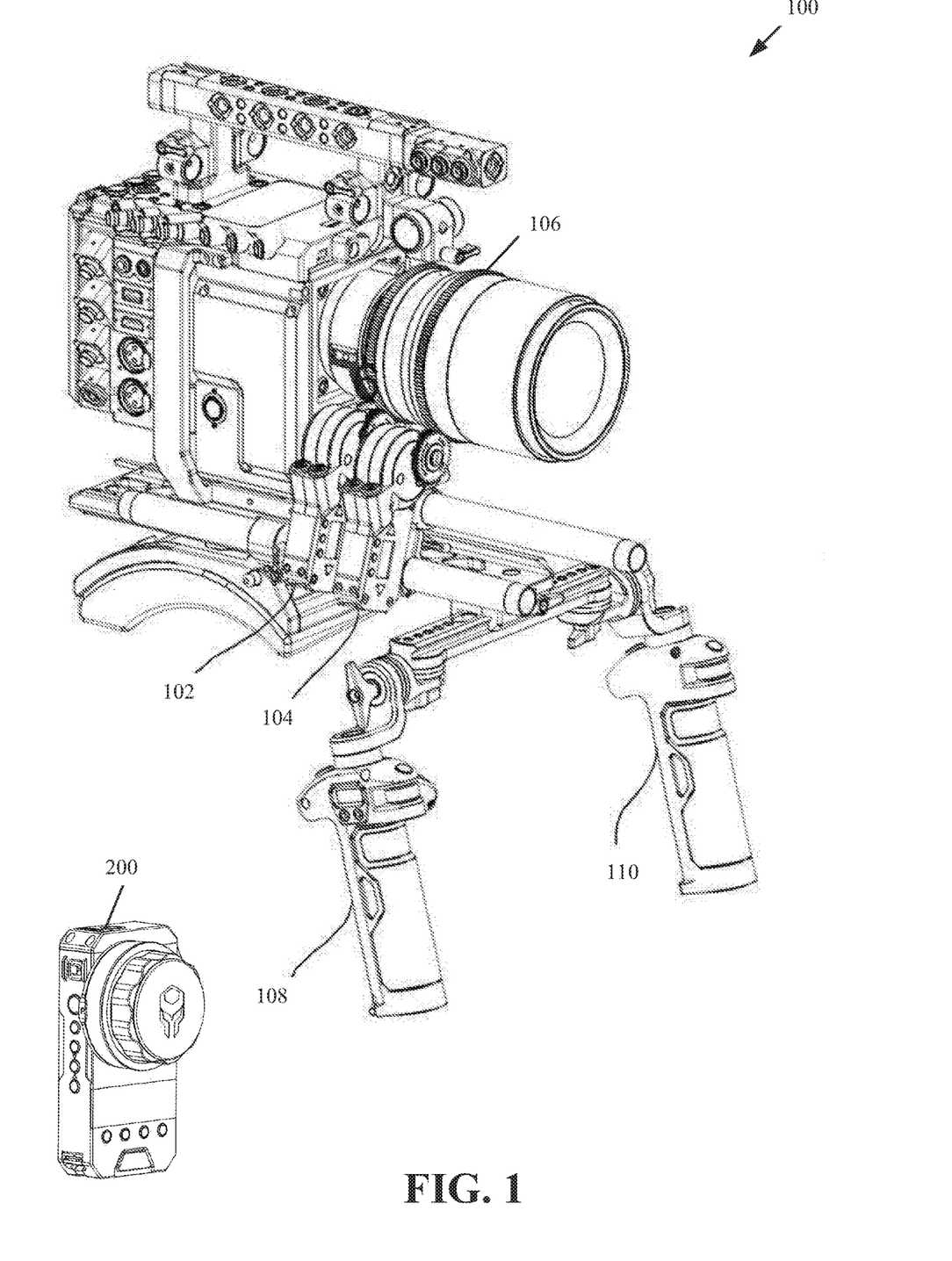
FIG. 1 is a diagram illustrating an exemplary camera lens control system with a hand control unit equipped with an adaptive display according to an embodiment.

Embodiments of the present disclosure provide a camera lens control system with a hand control unit equipped with an adaptive display for marking. In this disclosure, an adaptive display refers to a display that can be electronically controlled or programmed to display any desired objects. FIG. 1 is a diagram illustrating an exemplary camera rig according to an embodiment. The camera rig includes a camera and a camera lens control system 100. The camera lens control system may include one or more control motors for controlling, for example, focus, zoom, and/or iris of the camera. Two exemplary control motors 102 and 104 are illustrated in FIG. 1. In some examples, the camera lens control system may include three control motors for controlling, adjusting, or changing focus, zoom, and iris via respective gear rings 106 on the lens. Adjusting the focus changes the focus distance of the lens. Adjusting zoom changes the focal length of the lens. Adjusting iris changes the aperture size or stop of the lens. In some embodiments, the control motors may be implemented using DC brushless motors, stepper motors, etc. Each control motor has gears that mesh with a corresponding gear ring 106 on the lens such that the control motor can adjust the focus, zoom, or iris of the lens. The camera lens control system 100 may include one or more handles (two exemplary handles 108 and 110 illustrated in FIG. 1) for maneuvering and pointing the camera rig during shooting. In addition to providing physical control of the camera rig, the handles may be equipped to control the control motors wirelessly. The camera lens control system may include a hand unit 200 that can be used by a user to control the control motors (e.g., control motors 102 and 104).

Figure 2:
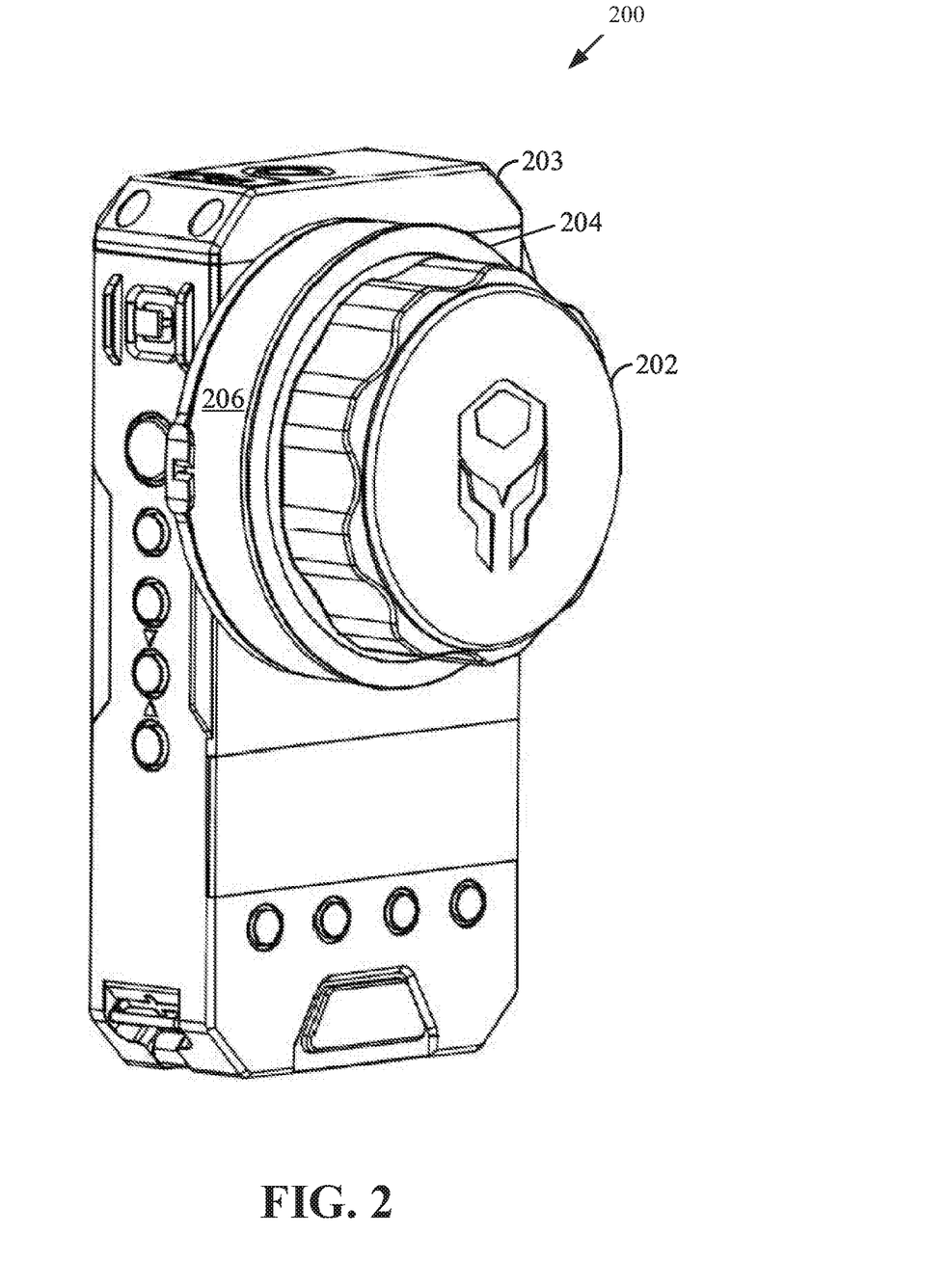
FIGS. 2 and 3 are diagrams respectively illustrating a perspective view and a side view of an exemplary hand unit according to an embodiment.
Figure 3:
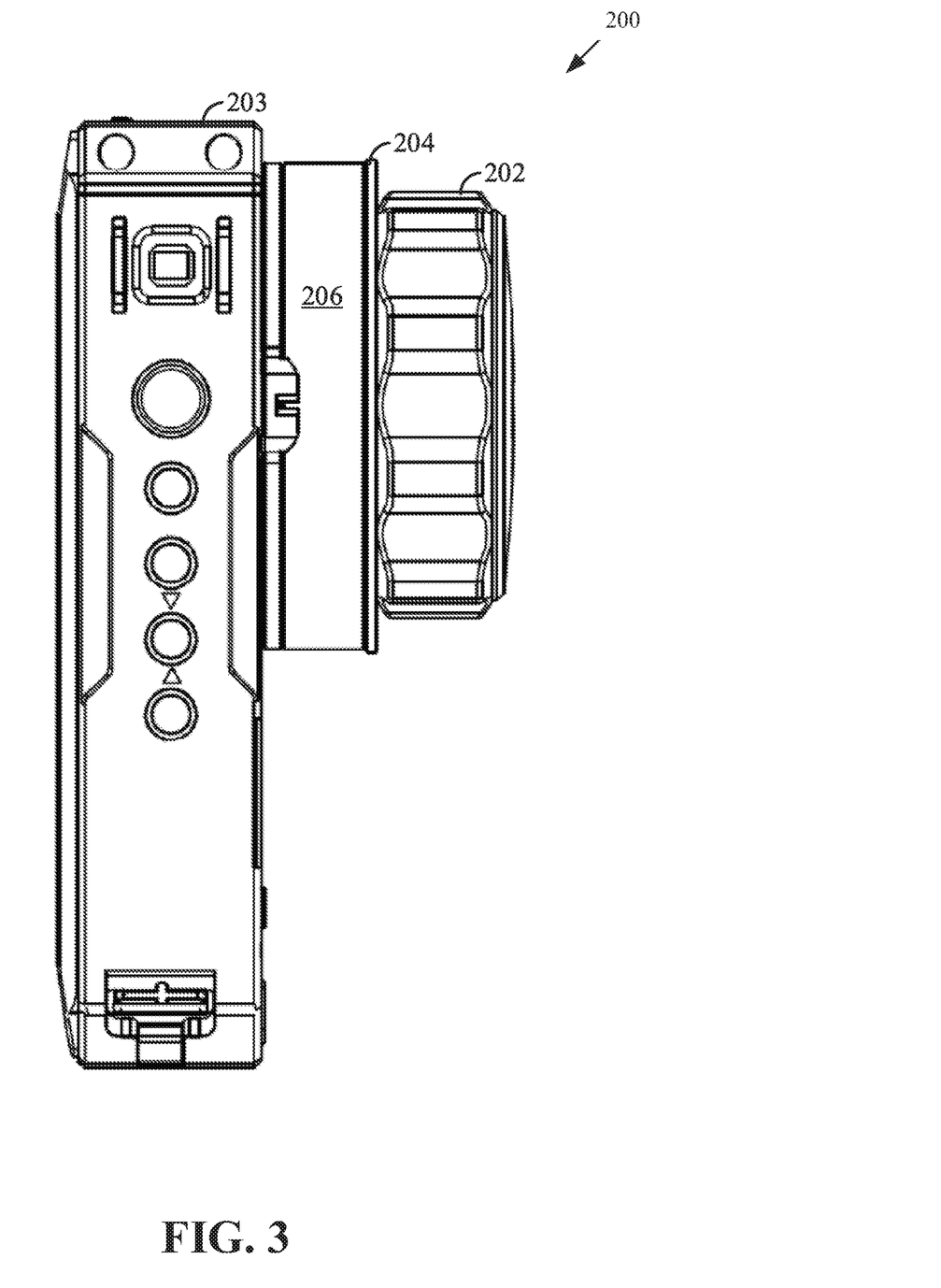

FIGS. 2 and 3 are diagrams respectively illustrating a perspective view and a side view of the hand unit 200 that can be configured to control one or more control motors (e.g., control motors 102 and 104). The hand unit 200 may communicate with the control motors via a wired or wireless connection or communication interface. The hand unit 200 may have a number of input devices (e.g., knob, dial, scroll wheel, joystick, button, switch, touchpad, pressure sensor, touch sensor, and/or touch screen) configured to receive user input corresponding to a desired lens control operation. The input devices may be located at various positions that can be easily operated by the user's hand or fingers. A user (e.g., camera operator or focus puller) can operate an input device to control an associated control motor (e.g., control motors 102, 104), for example, causing a change in the rotational and/or angular position of the control motor. Because the gear of each control motor engages the corresponding gear ring of the lens, the user can control the lens (e.g., focus, iris, zoom) by controlling the control motors via the hand unit 200.

In one example, the hand unit has a wheel 202 (e.g., a control knob) rotatably attached to a body 203 (e.g., a main body). The wheel 202 can be configured to control the focus, iris, or zoom of a lens. In general, when a user turns the wheel 202 in either direction (e.g., rotating left or right) about its rotational axis, the hand unit transmits control signals to the associated control motor to turn a gear ring on the lens. In one embodiment, the hand unit 200 has a marking ring equipped with an adaptive display 206. The adaptive display 206 can be electronically controlled to display various objects, items, or textual information. The marking ring 204 is secured to the wheel 202 so that the wheel 202 and marking ring 204 turn together when operated by the user. The display 206 may be flexible and shaped to wrap around or cover a significant portion of or the entire perimeter, circumference, or edge area of the marking ring 204. In some embodiments, the adaptive display 206 may be implemented using an electronic paper, organic light emitting diode (OLED) display, liquid crystal display (LCD), or any display technology that can be shaped or curved to conform to the shape of the marking ring 204. In some examples, the adaptive display 206 may include one or more individual displays placed adjacent to each other to cover the perimeter or circumference of the marking ring.

Figure 4:
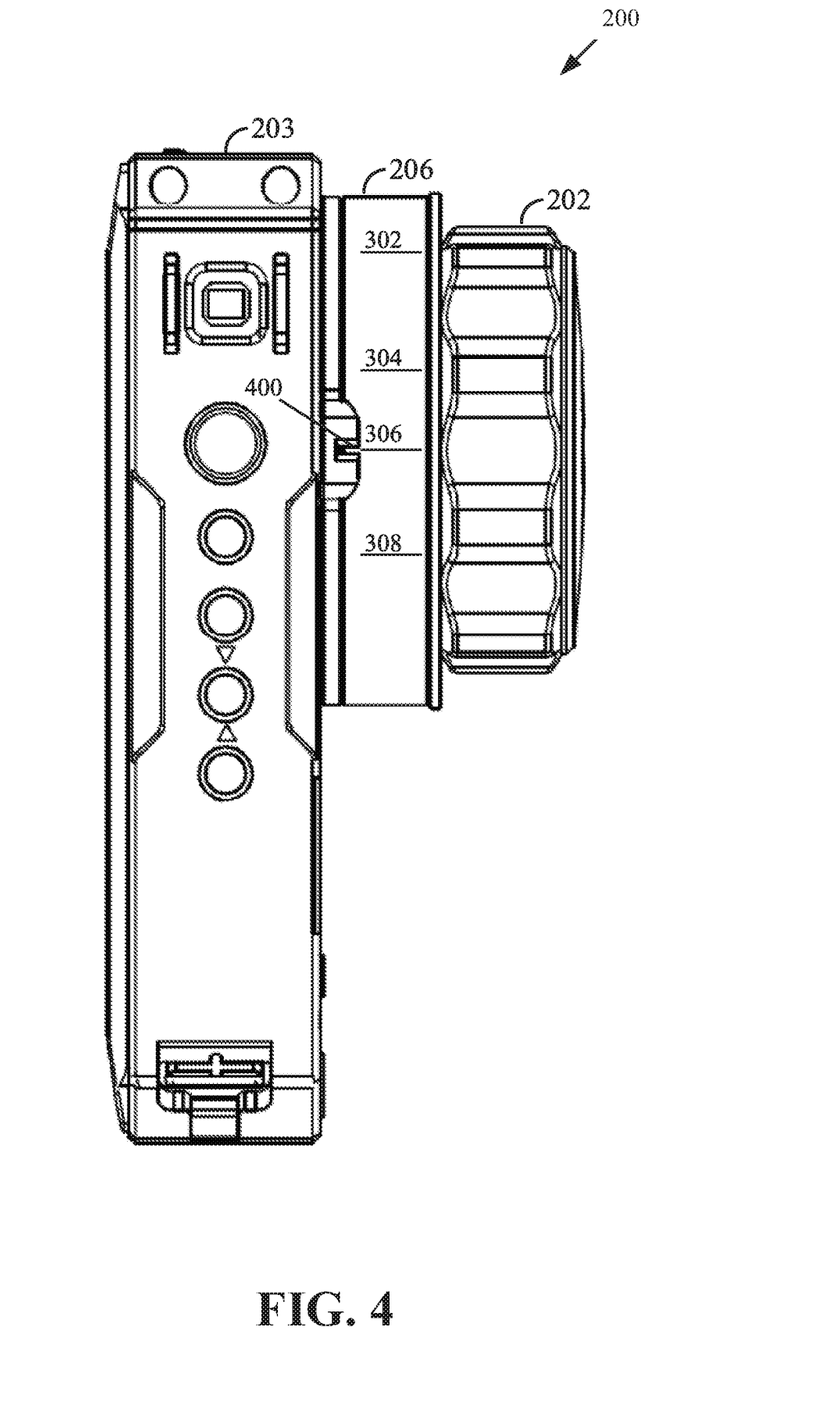
FIG. 4 is a diagram illustrating an adaptive display configured to display various markings for controlling a lens according to an embodiment.

Referring to FIG. 4, the adaptive display 206 may be configured to display various markings for mapping various rotational positions of the wheel 202 to the corresponding settings (e.g., iris, zoom, or focus) of the lens. In one example, the wheel 202 controls the focus of the lens via a corresponding control motor. Four exemplary markings (e.g., markings 302, 304, 306, and 308) are illustrated in FIG. 4. The user may perform a calibration or marking procedure to create and map the markings to the desired focus distances. For example, the first marking 302 may correspond to a first focus distance (e.g., infinity), the second marking 304 may correspond to a second focus distance closer than the first focus distance, the third marking 306 may correspond to a third focus distance closer than the second focus distance, and the fourth marking 308 may correspond to a fourth focus distance closer than the third focus distance. After the marking ring 204 is calibrated with the desired markings, when a user turns the wheel 202 to line up one of the markings with a pointer 400 on the hand unit, the hand unit causes the control motor to turn the corresponding gear ring of the lens so that the focus distance is set to the distance mapped to the marking. For example, when the user turns the wheel 202 to line up the second marking 304 with the pointer 400, the control motor turns the corresponding gear ring of the lens so that the focus distance is set to the second focus distance. Similarly, the user can turn the wheel 202 to set the focus distance to the third or fourth focus distance by lining up the third or fourth marking, respectively, with the pointer 400. While only four markings are described in relation to FIG. 4, the adaptive display 206 may be configured to show more or fewer markings as needed in various applications for controlling different functions of the lens, for example, iris, focus, or zoom.

Figure 5:
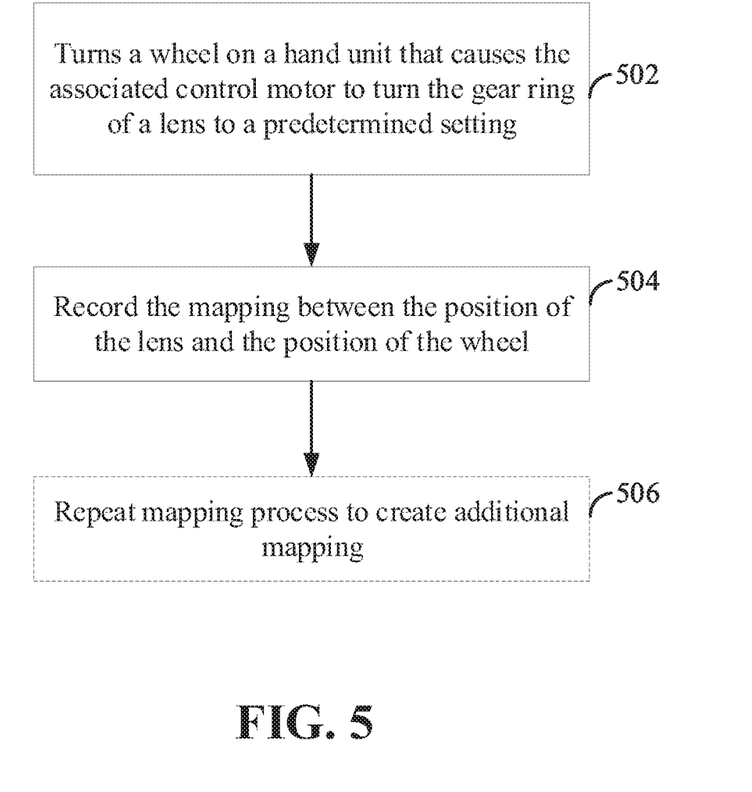
FIG. 5 is a diagram illustrating a process for configuring an adaptive display of a hand unit according to an embodiment.

FIG. 5 is a diagram illustrating a process for configuring an adaptive display 206 of a hand unit according to one embodiment. A user may use this process to configure the hand unit 200 with an adaptive display to control a camera lens. At block 502, the user turns or rotates the wheel 202 on a hand unit that causes the associated control motor to turn the gear ring of a lens to a predetermined setting (e.g., aperture size, focus distance, or focal length). In one example, the predetermined setting may be the desired focus distance. Once the lens is set to the desired setting, at block 504, the user may record this mapping between the current setting of the lens and the position of the wheel. The mapping creates a corresponding relation between the lens setting and the position of the wheel. For example, the user may operate an input device (e.g., a button or a touch screen) on the hand unit 200 to record the mapping. In one example, the hand unit may have non-volatile memory (e.g., FLASH memory) for storing the mapping in a lens profile. Once the mapping is recorded, the adaptive display may display a marking at the position indicated by the pointer 400. For example, the adaptive display 206 may show the mapped focus distance adjacent to the marking. At block 506, the user may repeat the above-described procedure to create more mappings for additional lens settings (e.g., focus distances). The markings stored at the hand unit may be recalled later when the same lens is used.

Figure 6:
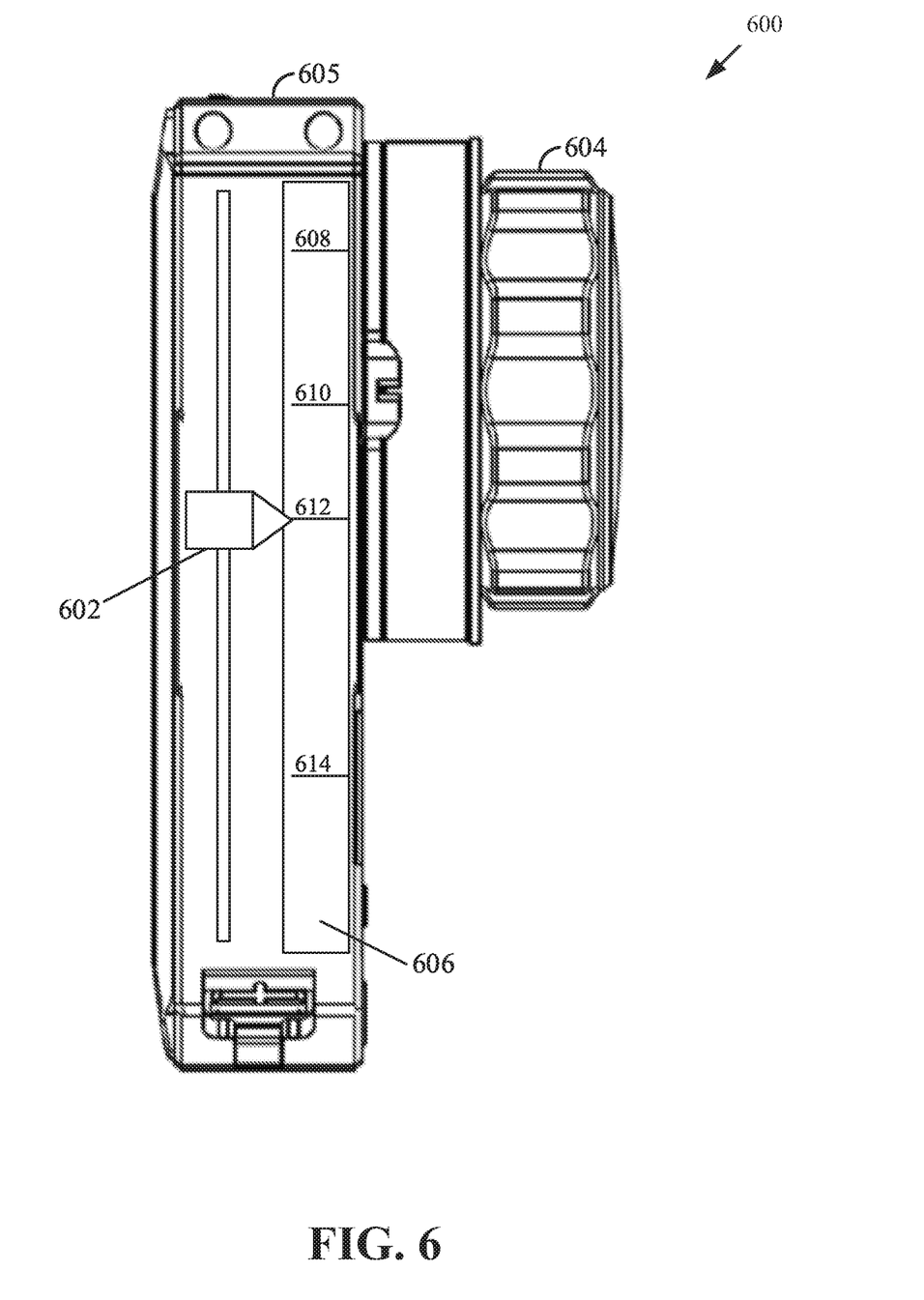
FIG. 6 is a diagram illustrating a hand unit for a camera lens control system according to another embodiment.

FIG. 6 is a diagram illustrating a hand unit 600 for controlling one or more control motors (e.g., control motors 102 and 104) according to another embodiment. The hand unit 600 is similar to the hand unit 200 described above in relation to FIGS. 2 and 3. The hand unit 600 provides an input device implemented as a slider 602 for controlling a lens via an associated control motor (e.g., control motor 102 or 104). In some examples, the hand unit 600 may provide an optional wheel or control knob 604 for controlling the lens. The wheel 604, if provided, is rotatably attached to a body 605. The wheel 604 may be substantially similar to the wheel 202 of the hand unit 200 described above.

In one example, the slider 602 may be operated in a transitional direction to control the iris of the lens. When a user moves the slider 602 in a certain direction (e.g., up or down in FIG. 6), the hand unit 600 transmits control signals to the associated control motor to turn a corresponding gear ring on the lens. In one embodiment, the hand unit 600 has an adaptive display 606. The adaptive display 606 may be shaped in a substantially elongated shape (e.g., rectangular shape) extending in parallel to the slider's moving direction. In some embodiments, the adaptive display 606 may be implemented using any suitable display technology (e.g., electronic paper, OLED display, LCD, LED, etc.). In some examples, the adaptive display 606 may include one or more displays positioned adjacent to each other.

Referring to FIG. 6, the adaptive display 606 may be configured to display various markings for mapping various positions of the slider 602 to the corresponding settings (e.g., iris, zoom, or focus) of the lens. In one example, the slider 602 controls the iris of the lens. Four exemplary markings 608, 610, 612, and 614 are illustrated in FIG. 6. The user may perform a calibration procedure to map the markings to the desired iris settings (e.g., apertures). For example, the first marking 608 may correspond to a first aperture size, the second marking 610 may correspond to a second aperture size larger than the first aperture size, the third marking 612 may correspond to a third aperture size larger than the second aperture size, and the fourth marking 614 may correspond to a fourth aperture size larger than the third aperture size. Once the slider 602 is calibrated for controlling the lens, when the user moves the slider 602 to line up the first marking 608 with a pointer on the slider, the corresponding control motor turns the corresponding gear ring of the lens so that the iris is set to the first aperture size. Similarly, when the user moves the slider 602 to line up the second marking 610 with the pointer, the corresponding control motor turns the corresponding gear ring of the lens so that the iris is set to the second aperture size. Similarly, the user can move the slider 602 to set the iris to the third or fourth aperture size using the third or fourth marking, respectively. While only four markings are described in relation to FIG. 6, the adaptive display 606 may be configured to show more or fewer markings as needed in various applications for controlling different functions of the lens, for example, iris, focus, or zoom.

Figure 7:
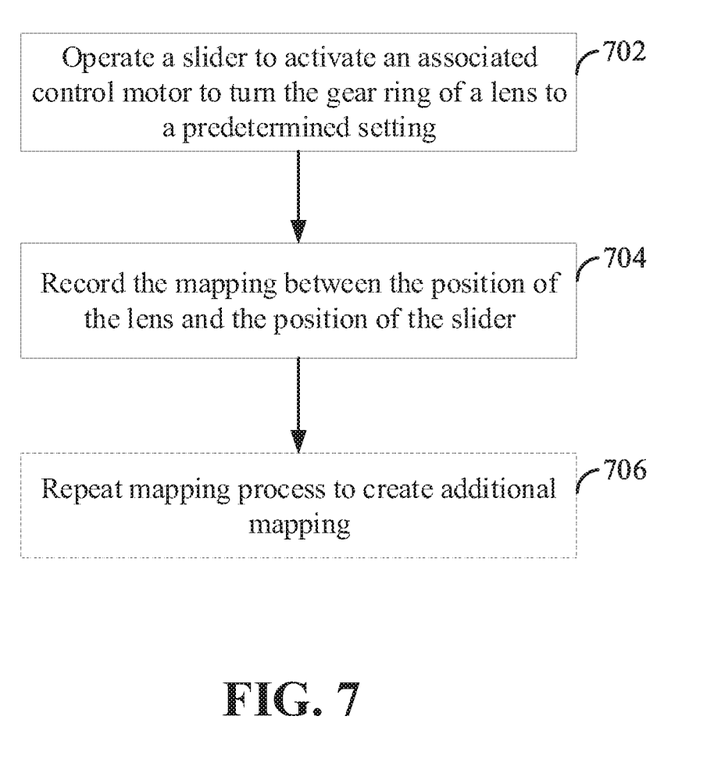
FIG. 7 is a diagram illustrating a process for configuring an adaptive display of a hand unit according to another embodiment.

FIG. 7 is a diagram illustrating a process for configuring an adaptive display of a hand unit according to one embodiment. For example, a user may use this process to configure the adaptive display of the hand units described in relation to FIGS. 6, 9, and 10. At block 702, the user operates the slider 602 to activate an associated control motor to turn the gear ring of a lens to a predetermined setting (e.g., aperture size, focus distance, or focal distance). In one example, the predetermined setting may be the desired aperture size. Once the lens is set to the predetermined setting, at block 704, the user may record this mapping between the current setting of the lens and the position of the slider 602. The mapping indicates the corresponding relation between the lens setting and the position of the slider. For example, the user may operate an input device (e.g., a button or a touch screen) on the hand unit to record the mapping in a lens profile. In one example, the hand unit may have non-volatile memory (e.g., FLASH memory) for storing the mapping in a lens profile. Once the mapping is recorded, the adaptive display may display a marking at the position indicated by the pointer of the slider 602. At block 706, the user may repeat the above-described procedure to create more markings that are mapped to additional lens settings (e.g., aperture sizes).

Figure 8:
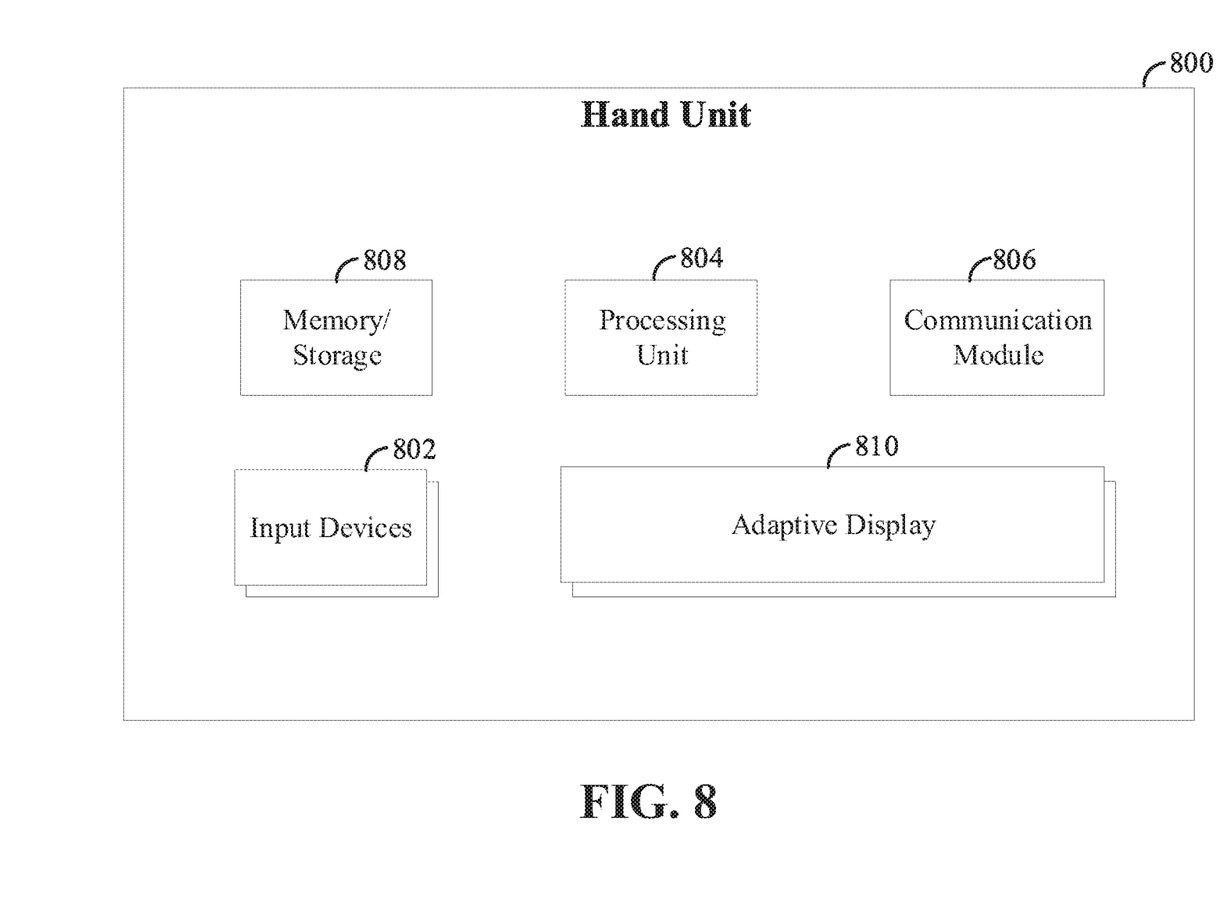
FIG. 8 is a block diagram illustrating some components of an exemplary hand unit according to an embodiment.

FIG. 8 is a block diagram illustrating some components of an exemplary hand unit 800 according to an embodiment. The hand unit 800 may be used to implement any of the hand units shown in FIGS. 1-4, 6, 9, and 10. Some components not necessary for understanding the present disclosure may be omitted in FIG. 8 for brevity.

The hand unit 800 may include one or more input devices 802, a processing unit 804, a communication module 806, a memory storage 808, and one or more adaptive displays 810. The adaptive displays may include a flexible display such as flexible OLED and flexible electronic paper. These components are operatively coupled together, for example, via mechanical and electrical connections. The input devices 802 receive inputs or commands from a user for configuring, controlling, and operating various functions of the hand unit 800, for example, controlling the control motors 102 and 104 to adjust various settings (e.g., iris, zoom, and focus) of the lens. Non-limiting examples of the input devices 802 are knobs, wheels, dials, scroll wheels, joysticks, buttons, switches, touchpads, pressure sensors, touch sensors, touch screens, and more. The input devices convert the user's input or comments into a signal (e.g., an electrical signal) that may be provided to the processing unit 804.

The processing unit 804 may be configured to perform various functions including, for example, camera lens control functions (e.g., iris, zoom, and focus) via one or more control motors. The processing unit 804 is operatively coupled to the input devices 802 and communication module 806 via, for example, a data bus or any suitable communication network or connection. The processing unit 804 receives an input signal from each input device 802 and converts the input signal into the corresponding motor control signal that is transmitted to the control motor via the communication module 806. Examples of the processing unit 804 include microprocessors, microcontrollers, digital signal processors (DSPs), field programmable gate arrays (FPGAs), programmable logic devices (PLDs), state machines, gated logic, discrete hardware circuits, and/or other suitable hardware configured to perform the various functionality described throughout this disclosure.

The communication module 806 may be configured to transmit the control signals to the control motors using a wireless or wired connection. In one example, the communication module 806 may be implemented to support one or more wireless communication protocols and standards (e.g., Bluetooth, Wi-Fi, Wireless USB, WiGig, cellular, etc.) known in the art or custom protocols. In some embodiments, the communication module 806 may include one or more wireless transmitters and receivers for transmitting and receiving wireless signals.

The processing unit 804 may be configured by executing code stored in the memory/storage 808 to perform various functions including motor control functions and communication functions. The memory/storage 808 may include volatile memory (e.g., random access memory) and non-volatile memory (NVM) that can be used to store one or more lens profiles. Each profile can map the positions of an input device 802 (e.g., wheel, knob, or slider) to the corresponding lens settings (e.g., apertures, focal lengths, and focus distances). The adaptive display 810 may be any suitable display (e.g., LCD, LED, OLED, electronic paper, etc.) that can be configured to display various markings according to a lens profile. During operation, the user may recall, load, or activate a profile from the memory 808, and the adaptive display 810 displays the markings mapped to the predetermined settings (e.g., apertures and focus distances) of the lens according to the selected profile. The markings on the adaptive display 810 can change according to the profile selected. Once a profile for a lens is stored at the hand unit, the user can change to another lens, and later recall the profile when the same lens is used without performing the calibration process again to recreate the markings. When multiple profiles are stored at the hand unit, the user can switch lens quickly without the need to recreate the markings again for each lens.

Figure 9:
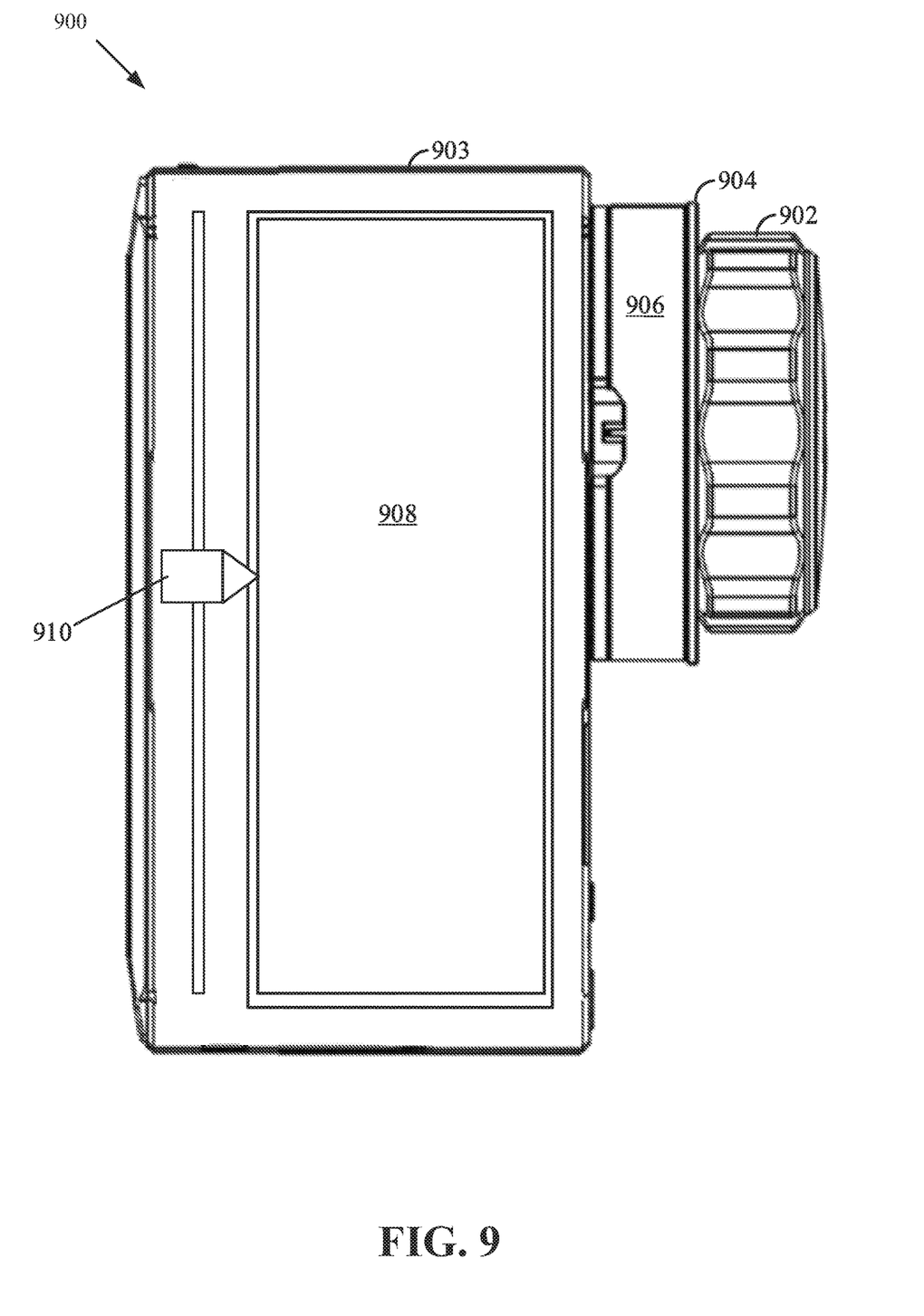
FIG. 9 is a diagram illustrating an exemplary hand unit for a camera lens control system according to an embodiment.

FIG. 9 is a diagram illustrating a hand unit 900 for a camera lens control system according to another embodiment. The hand unit 900 is similar to the hand units described above in relation to FIGS. 2-4 and 6, and the description of similar parts and components may be omitted. The hand unit 900 may communicate with one or more control motors via a wired and/or wireless connection or communication interface. The hand unit 900 may have one or more input devices (e.g., knob, wheels, dial, scroll wheel, joystick, button, switch, touchpad, pressure sensor, touch sensor, touch screen) configured to receive a user input for controlling a lens. Not all of the input devices are shown in FIG. 9. Some of the input devices may be located on the sides of the hand unit 900 that are not shown in the figure. The user (e.g., camera operator or focus puller) can operate an input device to control an associated control motor (e.g., control motors 102 and 104). Because the gear of each control motor engages the corresponding gear ring of the lens, the user can control the lens (e.g., focus, iris, zoom) via the control motors that are controlled by the hand unit.

In one example, the hand unit has a body 903 and a wheel 902 that can be configured to control the focus, iris, or zoom of a lens. The wheel 902 is substantially similar to the wheel 202 described above in relation to FIGS. 2-4. In one embodiment, the hand unit 900 has a marking ring 904 equipped with an adaptive display 906. The adaptive display 906 may be flexible and shaped to wrap around or cover a portion of or the entire perimeter, circumference, or edge area of the marking ring 904. In some embodiments, the adaptive display 906 may be implemented using an electronic paper, OLED display, LCD, LED, or any display technology that can be shaped or curved to conform to the shape of the marking ring 904. In some examples, the adaptive display 906 may include one or more displays joined together to wrap around the perimeter, circumference, or edge area of the marking ring 904.

In some embodiments, the hand unit 900 may be equipped with a detachable or removable display 908 that can be used to display various information for configuring, controlling, and operating the hand unit. The detachable display 908 may be implemented using an electronic paper, OLED display, LCD, LED, or any display technology. The detachable display 908 is configured to be easily removed from and installed in the hand unit 900. For example, the display 908 may have connectors that are positioned to mate with corresponding connectors or contacts on the hand unit 900 for power and control connections. The detachable display 908 may have a locking mechanism that allows easy installation and removal of the display 908 to and from the hand unit 900.

In some examples, the detachable display 908 may be configured to display markings (not shown in FIG. 9) for a slider 910 to control a setting (e.g., aperture, focal length, or focus distance) of the lens. A profile for the markings may be generated using a procedure similar to those described above in relation to FIGS. 5 and 7. Once the profile is created, it can be saved at the hand unit 900 for later use when the same lens is used again. Multiple profiles for different lenses may be created and stored at the hand unit 900.

Figure 10:
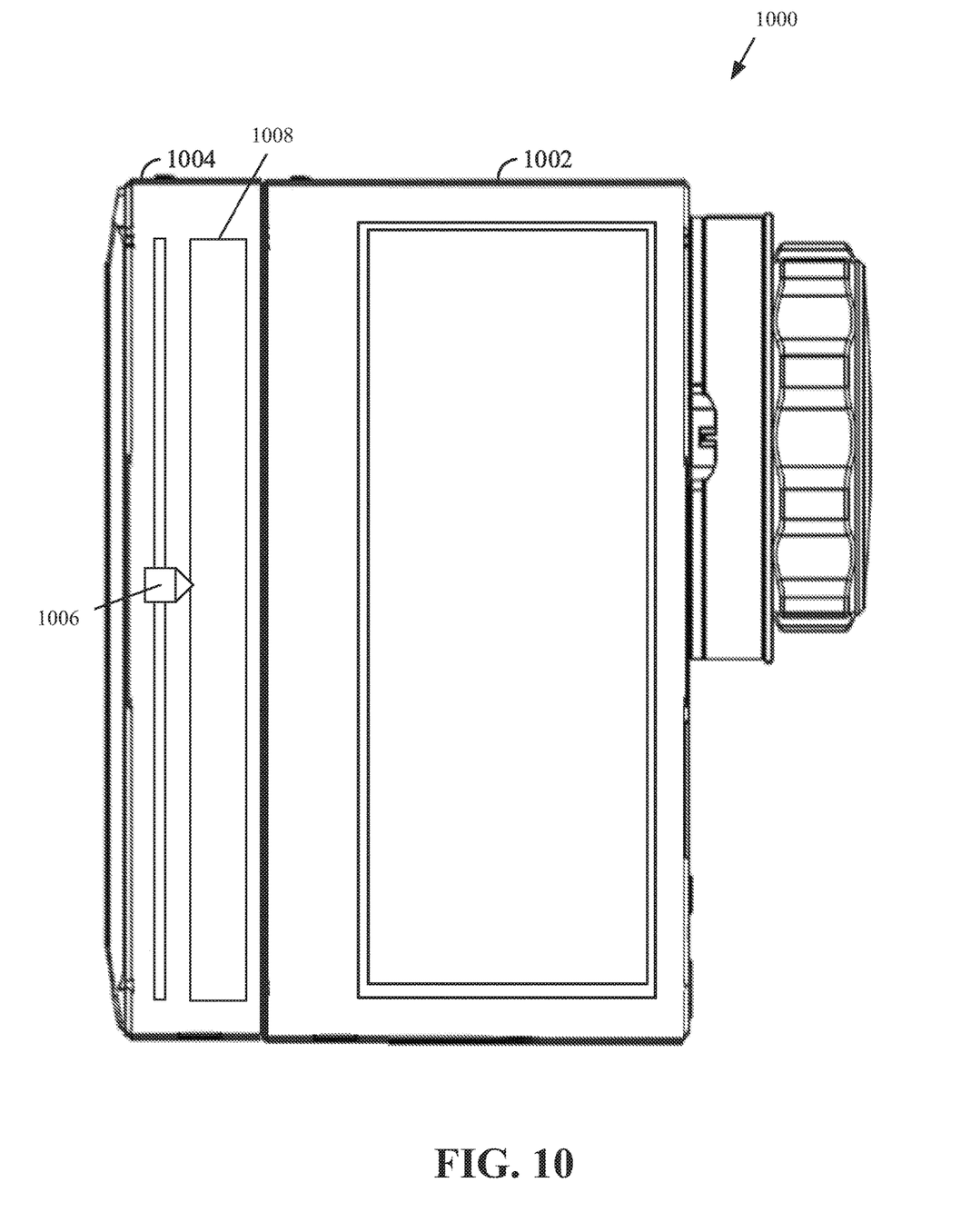
FIG. 10 is a diagram illustrating a camera control system for controlling one or more control motors according to another embodiment.

FIG. 10 is a diagram illustrating a camera control system 1000 according to another embodiment. The camera control system 1000 includes a hand unit 1002 and a detachable slider bar. Some features of the hand unit 1002 are similar to the hand units described above in relation to FIGS. 2-4, 6, and 9; and therefore, repeating description may be omitting. The slider bar 1004 is removably attached to the hand unit 1002, and the slider bar 1004 may be detached from the hand unit 1002 when the slider bar 1004 is not needed. The slider bar 1004 includes a slider 1006 (input device) that can be moved in a transitional direction. The slider bar 1004 further includes an elongated display 1008 extending in a direction parallel to the transitional direction of the slider. In some examples, the elongated display 1008 may be configured to display markings (not shown in FIG. 10) for use with the slider 1006 to control a setting (e.g., aperture, focal length, or focus distance) of a lens. A profile for mapping the markings to a lens may be generated using a procedure similar to those described above in relation to FIGS. 5 and 7. Once the profile is created, it can be stored at the hand unit 1002 for later use when the same lens is used again. Multiple profiles for different lenses may be created and stored at the hand unit.

Figure 11:
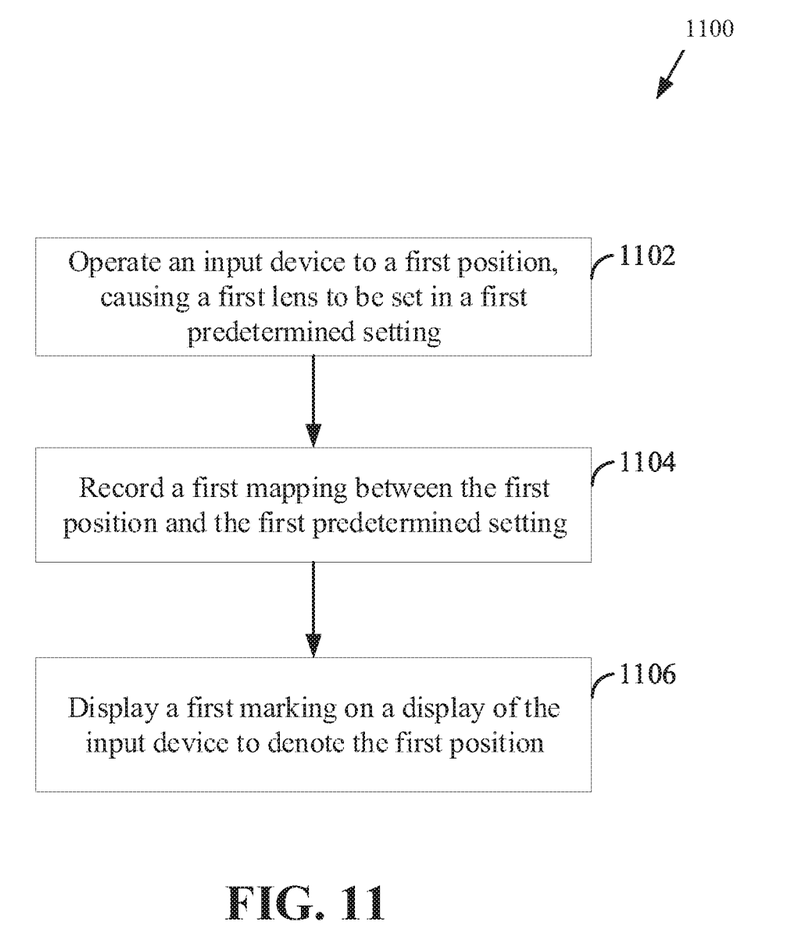
FIG. 11 is a diagram illustrating a method for controlling a camera control system according to one embodiment.

FIG. 11 is a diagram illustrating a method 1100 for controlling a camera control system according to one embodiment. For example, a user may use the method 1100 to control any of the hand units described above in relation to FIGS. 2-4, 6, and 8-10. At block 1102, a user operates an input device of a hand unit to a first position, causing a first lens to be set in a first predetermined setting. For example, the input device may be a control knob or slider of the hand units illustrated in FIGS. 1-4, 6, and 8-10. The first position may be a certain rotational or transitional position of the input device. The predetermined setting may be an aperture size, focal length, or focus distance. At block 1104, the user records a first mapping between the first position and the first predetermined setting. The mapping creates a corresponding relation between the first position and the first predetermined setting of the lens such that when the input device is set to the first position, the camera control system causes the lens to be set in the first predetermined setting. At block 1106, the hand unit displays a first marking on a display of the input device to denote the first position. In one example, the display may be a flexible display that wraps around a marking ring. In another example, the display may be an elongated display on a slider bar.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A hand unit for a camera control system for controlling a lens, comprising:
    a body comprising a non-volatile memory configured to store a first profile and a second profile respectively corresponding to a first lens and a second lens;
    a control knob rotatably attached to the body, the control knob configured to receive a user input for controlling a lens setting; and
    a marking ring concentrically coupled with the control knob, the marking ring comprising a display configurable to display one or more markings corresponding to the lens setting, wherein the marking ring is configurable to display:
        a first plurality of markings that are mapped to respective predetermined settings of the first lens stored in the first profile; and
        a second plurality of markings that are mapped to respective predetermined settings of the second lens stored in the second profile.

2. The hand unit of claim 1, wherein the display comprises a flexible display.

3. The hand unit of claim 1, wherein the display comprises at least one of a liquid crystal display, a light emitting diode display, or an electronic paper display.

4. The hand unit of claim 1, wherein the display is configured to cover at least a portion of a perimeter of the marking ring.

5. The hand unit of claim 1, wherein each of the one or more markings indicates a rotational position of the control knob that corresponds to a predetermined setting of the first lens or second lens.

6. The hand unit of claim 5, wherein the predetermined setting comprises an aperture size, a focus distance, or a focal length of the first lens or second lens.

7. The hand unit of claim 1, wherein the body comprises a removable display configured to provide a user interface of the hand unit.

8. A method of operating a hand unit of a camera control system for controlling a camera, the hand unit comprising a body and an input device operatively attached to the body, comprising:
    operating the input device to a first position relative the body, causing a first lens installed on the camera to be set in a first predetermined setting;
    recording a first mapping between the first position and the first predetermined setting;
    displaying a first marking on a display of the input device to denote the first position;
    moving the input device to a second position relative the body, causing the first lens to be set in a second predetermined setting that is different from the first predetermined setting;
    recording a second mapping between the second position and the second predetermined setting;
    displaying a second marking on the display to denote the second position;
    storing a first lens profile in a non-volatile memory included in the body, the first lens profile comprising the first mapping and the second mapping;
    replacing the first lens with a second lens on the camera; and
    retrieving a second lens profile from the non-volatile memory to configure the display to display a plurality of markings that are mapped to respective predetermined settings of the second lens.

9. The method of claim 8, wherein the first predetermined setting comprises an aperture size, a focus distance, or a focal length of the first lens.

10. The method of claim 8, wherein the operating the input device comprising rotating the input device about a rotational axis of the input device.

11. The method of claim 8, wherein the display comprises a flexible display.

12. The method of claim 11, wherein the display covers at least a portion of a perimeter of the input device.

13. The method of claim 8, wherein the display comprises at least one of a liquid crystal display, a light emitting diode display, or an electronic paper display.

* * * * *